June 21, 1938.  F. M. VANDERVOORT  2,121,214

LUBRICATING MEANS FOR CHANGE SPEED MECHANISMS

Filed May 2, 1935

INVENTOR.
Francis M. Vandervoort.
BY
ATTORNEY.

Patented June 21, 1938

2,121,214

UNITED STATES PATENT OFFICE 2,121,214

LUBRICATING MEANS FOR CHANGE SPEED MECHANISMS

Francis M. Vandervoort, Cleveland, Ohio, assignor to The White Motor Company, Cleveland, Ohio, a corporation of Ohio Application May 2, 1935, Serial No. 19,448

5 Claims. (Cl. 184—6)

This invention relates to change speed mechanisms, and has for its primary object the provision of a simple and efficient means for lubricating the bearing surface of the mechanisms of the type specified.

Figure 1:
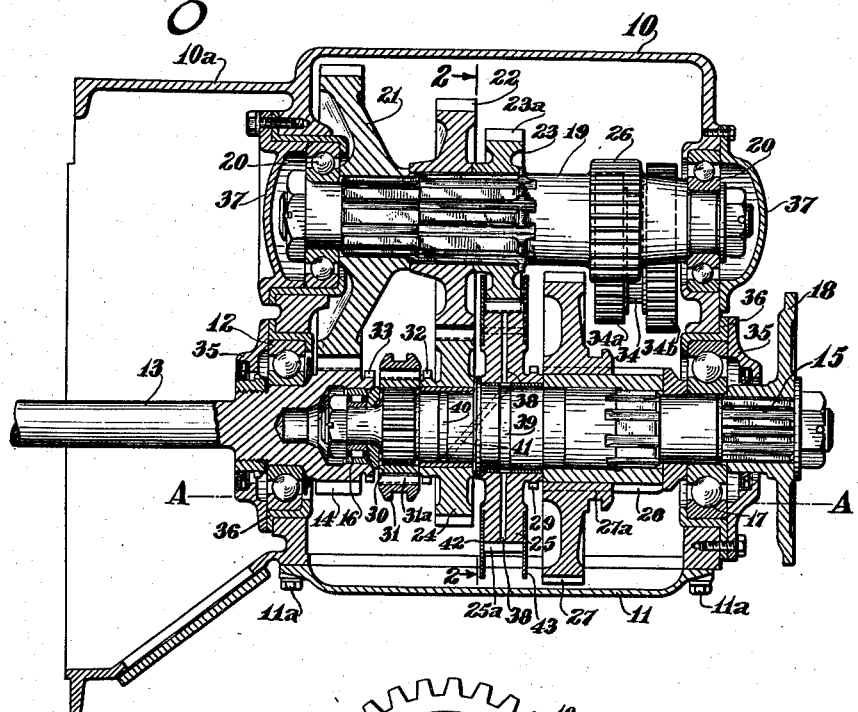
Figure 2:
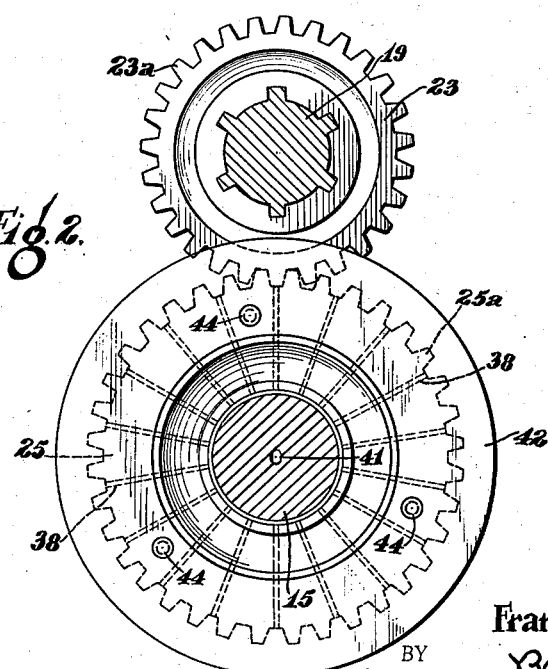

Other objects will appear in the following description of one practical embodiment of my invention illustrated in the accompanying drawing, in which:

Figure 1 is a longitudinal section of an automobile transmission embodying the present invention, and Figure 2 is an enlarged fragmentary sectional view of the transmission taken on line 2—2 of Figure 1.

The transmission illustrated in the drawing comprises a casing 10 formed with an open bottom and with a forwardly extending flange 10a designed to join with a bell shaped flange on the automobile engine employed with the transmission. The bottom of the housing 10 is closed by a removable cover plate 11 held in place by cap screws 11a.

Extending into the forward end of the transmission housing 10 and supported in a bearing 12 mounted in the forward end wall of the housing, there is a driving shaft 13, which in assembly of the transmission with the engine employed therewith is connected to a clutch mechanism for establishing a drive between it and the engine. The inner end of the shaft 13 is formed with an integral gear 14 which is axially bored to receive the end of an aligned driven shaft 15 which extends through the rear wall of the casing 10. The driven shaft 15 is supported at its forward end within the gear 14 by means of a roller bearing 16, and at its rear end by a ball bearing 17 mounted in the rear wall of the casing. Secured upon the rear end of the driven shaft 15, there is a flange member 18 through which such shaft is connected with the driving mechanism of the automobile within which the transmission is installed.

Mounted above the driven shaft 15, there is a countershaft 19 supported in bearings 20 mounted in the front and rear walls of the casing. Fixed on the forward end of the countershaft 19 are three gears 21, 22 and 23 which mesh respectively with the gear 14 on the driving shaft 13 and two gears 24 and 25 rotatably mounted on the driven shaft 15; and integrally formed on the countershaft 19 adjacent the rear wall of the casing 10, there is a gear 26 designed for meshing engagement with a gear 27 slidably and non-rotatably mounted upon the driven shaft 15.

The gear 27 is mounted upon the driven shaft 15 through the instrumentality of a splined sleeve 28, and is formed with internal splines 27a designed for interlocking engagement with teeth 29 formed on the gear 25; and splined upon a sleeve 30 nonrotatably mounted upon the forward end of the driven shaft 15 there is a clutch member 31 the inner splined teeth 31a of which are designed for engagement with teeth 32 formed on the gear 24 and with teeth 33 formed on the gear 14.

Slidably and rotatably mounted upon a shaft located at one side of the countershaft 19, there is an integrally formed gear set 34 consisting of two gears 34a and 34b. This gear set is so constructed and arranged that it can be moved from the position shown in the drawing to a position in which the gears 34a and 34b thereof are brought into engagement with the gears 27 and 26 on the driven shaft and countershaft.

Assuming that in each instance the clutch member 31 and the gear 27 initially occupy the positions shown, four forward speeds and a single reverse speed are obtained as follows:

First speed, by shifting the gear 27 in a rearward direction to bring it into a position with its teeth in mesh with the teeth of the gear 26, the resulting drive being through gears 14, 21, 26 and 27.

Second speed, by shifting the gear 27 in a forward direction to bring its internal splined teeth 27a into engagement with the teeth 29 on the gear 25, the resulting drive being through gears 14, 21 23 and 25.

Third speed, by shifting the clutch member 31 in a rearward direction to bring its splined teeth 31a into engagement with the teeth 32 on the gear 24, the resulting drive being through gears 14, 21, 22 and 24.

Fourth speed or direct drive, by shifting the clutch member 31 in a forward direction to bring its splined teeth 31a into engagement with the teeth 33 on the gear 14, and Reverse, by shifting the gear set 34 in a forward direction to bring the gears 34a and 34b thereof into engagement with the gears 27 and 26, the resulting drive being through gears 14, 21, 26, 34b, 34a and 27.

The lower portion of the transmission casing 10 serves as a lubricant reservoir, the normal height of the lubricant being indicated in Figure 1 by the line A—A. The escape of lubricant about the shafts 13 and 15 is prevented by suitable sealing means mounted in the caps 35 of the cages 36 for the bearings 12 and 17. The escape of lubricant through the bearings 20 is prevented by constructing the retaining cages for such bearings with caps 37 which close the outer sides of the bearings.

In operation of the transmission, lubricant is carried and thrown up from the reservoir just described by the action of the gears of the transmission into the upper part of the casing 10, from where it flows back into the reservoir. The circulation of lubricant thus produced effects efficient lubrication of all of the wearing surfaces of the transmission except the bearing surfaces for the gears 24 and 25.

Means for delivering an adequate supply of lubricant to the bearing faces of the gears 24 and 25 is provided in the form of a direct feed lubricating system. Such system comprises a plurality of radial ducts 38 formed in the gear 25 and extending from the interstices between the teeth 25a of such gear to its interior annular surface, a groove 39 formed in the shaft 15 and communicating with the ducts 38, a second groove 40 formed in the shaft 15 intermediate the sides of the gear 24 and a diagonal duct 41 connecting the grooves 39 and 40, together with a pair of plates 42 and 43 secured to the sides of the gear 25 by means of rivets 44.

In the operation of the transmission, lubricant is carried up between the teeth 25a of the gear 25 and is forced into the ducts 38 by the interengagement of the teeth 23a of the gear 23. During the latter action, the plates 42 and 43, which are constructed with a greater diameter than the teeth 25a of the gear 25 and are arranged so as to extend in close proximity to the sides of the gear 23 act to restrain the lubricant from flowing out at the ends of the teeth 23a and 25a. From the ducts 38 the lubricant is forced into the groove 39 and through the diagonal duct 41 into the groove 40, and from the grooves 39 and 40 onto the bearing surfaces of the gears 25 and 24.

Although the foregoing description is necessarily of a detailed character in order that the invention may be completely set forth, it is to be understood that the specific terminology is not intended to be restrictive or confining, and that various rearrangements of parts and structural details may be resorted to without departing from the scope or spirit of the invention as herein claimed.

What I claim is:

1. The combination of a housing constructed with a lubricant reservoir, a shaft mounted in said housing, a gear rotatably mounted on said shaft and extending into the aforesaid reservoir, means for driving said gear including a gear arranged to mesh therewith, a plurality of ducts being provided in said first named gear leading from the interstices between the teeth of said gear to its interior annular surface, and radially projecting flanges carried by said first named gear arranged to straddle said second named gear and located in close proximity to the sides of said second named gear.

2. The combination, of a housing constructed with a lubricant reservoir, a shaft mounted in said housing, a gear rotatably mounted on said shaft, a plurality of ducts in said gear leading from the interstices between the teeth of said gear to the inner periphery thereof, means for driving said gear including a second gear arranged to mesh therewith, one of said gears extending beneath the lubricant level in the aforesaid reservoir, and radially projecting flanges carried by one of said gears arranged to straddle the other one of said gears and to enclose the interstices between the teeth of said gears.

3. The combination of a housing constructed with a lubricant reservoir, a shaft mounted in said housing, a gear rotatably mounted on said shaft and extending into the aforesaid reservoir, means for driving said gear including a gear arranged to mesh therewith, a plurality of ducts being provided in one of said gears leading from the interstices between the teeth of said gear to its interior annular surface, and radially projecting flanges carried by one of said gears arranged to straddle the other one of said gears and located in close proximity to the sides of the latter.

4. The combination of a housing constructed with a lubricant reservoir, a shaft mounted in said housing and fashioned with spaced grooves and with a duct affording communication therebetween, a pair of gears rotatably mounted on said shaft to enclose said grooves respectively, means for driving said gears including gears arranged to mesh therewith respectively, one of said gears extending below the oil level in the aforesaid reservoir, and a plurality of ducts in one of said first named pair of gears leading from the interstices between its teeth to the groove which it encloses.

5. The combination of a housing constructed with a lubricant reservoir, a shaft mounted in said housing and fashioned with a pair of spaced annular grooves and with a diagonal duct affording communication between said grooves, two gears rotatably mounted on said shaft to enclose said grooves respectively, one of said gears extending beneath the lubricant level in said reservoir and provided with a radial duct whereby lubricant drawn by said gear from said reservoir may reach its own bearing through its radial duct and thence from its groove flow along said diagonal duct to the other groove in the shaft.

FRANCIS M. VANDERVOORT.